June 2, 1970     R. L. SAMUELS     3,515,594
RADIANT ENERGY DRIVEN ORIENTATION SYSTEM
Filed Dec. 21, 1967     2 Sheets-Sheet 1
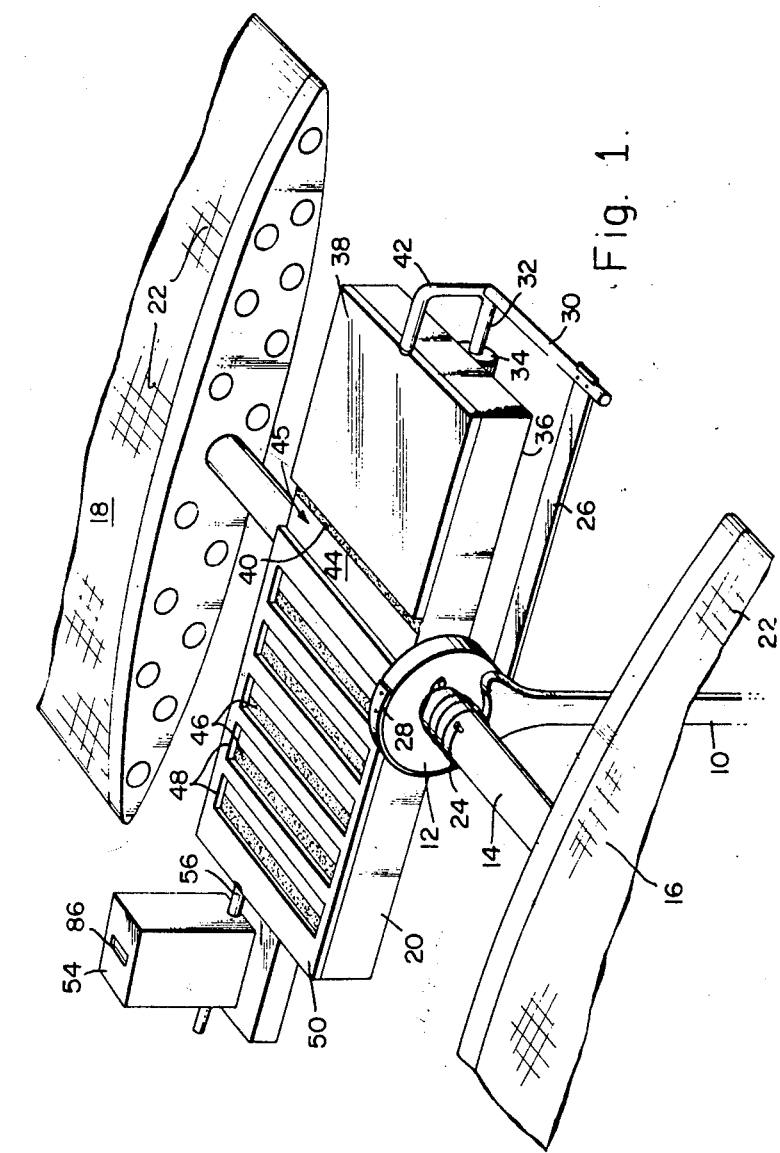
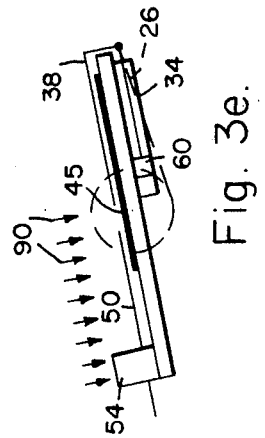
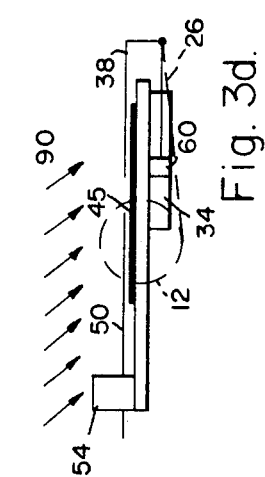
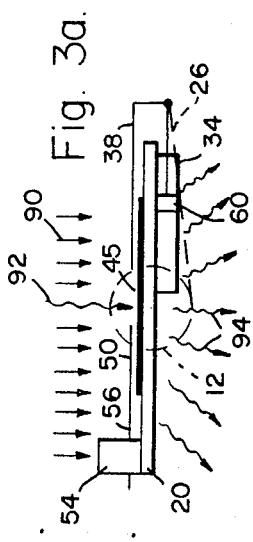
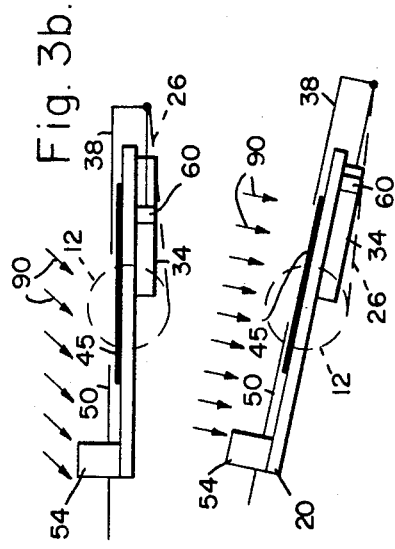
Ronald L. Samuels,
INVENTOR.
BY.
*Daniel T. Anderson*
ATTORNEY.

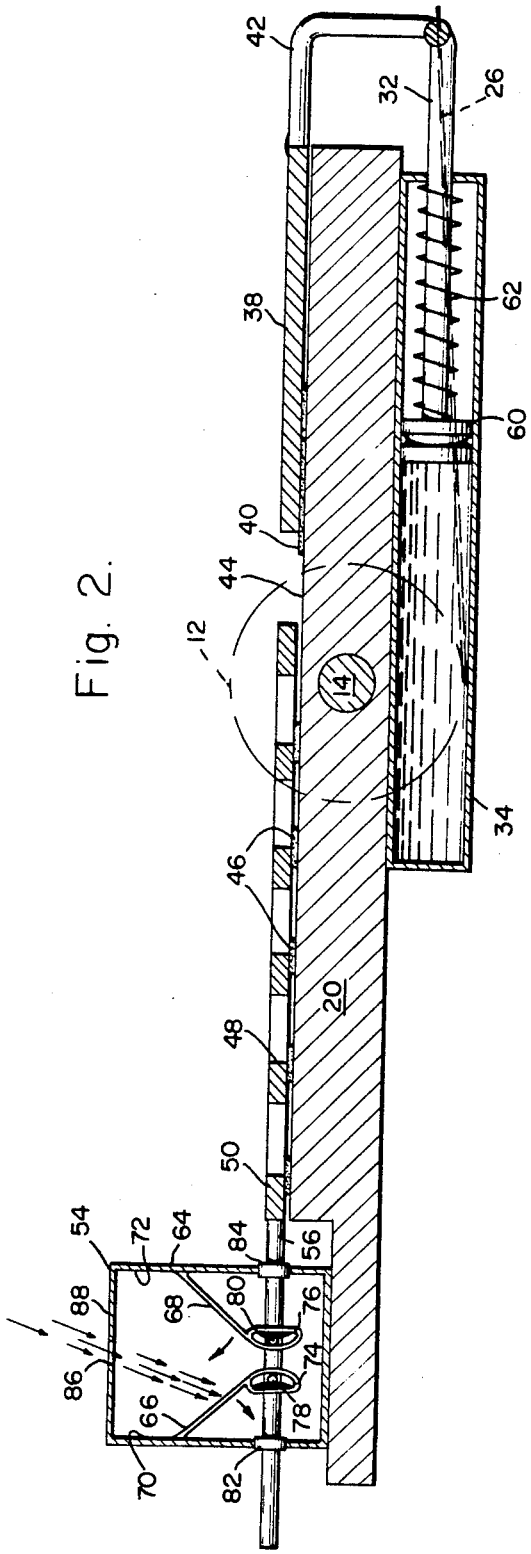

United States Patent Office 3,515,594
Patented June 2, 1970

3,515,594
RADIANT ENERGY DRIVEN ORIENTATION SYSTEM
Ronald L. Samuels, Redondo Beach, Calif., assignor to TRW Inc., Redondo Beach, Calif., a corporation of Ohio
Filed Dec. 21, 1967, Ser. No. 692,400
Int. Cl. H01m 15/02
U.S. Cl. 136—89          7 Claims

ABSTRACT OF THE DISCLOSURE

The specification discloses apparatus for automatically orienting a solar cell array toward the sun. A sensing panel having an absorbing surface to be exposed generally toward the sun and a radiating surface shielded from the sun but thermally connected to the absorbing surface is variably covered by a sensor shutter which is controlled by passive, bimetallic, radiation direction sensitive means connected to the solar cell array. A power drive unit including a thermally expansive fluid-filled cylinder and piston connected therewith is mounted on the panel and drives an array orienting mechanism in response to the temperature of the sensing panel as determined by its angle of exposure toward the sun, the degree of its shielding therefrom as by the sensing shutter, and the rate of thermal radiation from the sensing panel. The power drive element may also drive the second shutter for variable shielding of the panel for additional feedback control of the system.

BACKGROUND OF THE INVENTION

Field of the invention

This invention relates generally to radiation direction sensing and more particularly to novel improvements in systems for automatically orienting radiant energy apparatus with respect to the direction of the radiant energy and using such energy for the orienting power.

Although the present invenion exhibits particularly advantageous application in the field of orienting solar electric cell panels toward the sun for the greatest collector efficiency, and although, in the cause of brevity and clarity of presentation, much of the following discussion and description of examples of the invention is directed theretoward, it is expressly to be understood that the advantages fo the invention are equally well manifest in other fields wherein it is desired that the radiant energy of a source be utilized to orient apparatus toward that source, such as, for example, solar thermal energy collector panels, radar receiving antennas, navigational guidance systems, and the like.

Description of the prior art

In the field of solar electric generators, a relatively large number of solar cells typically are arranged in a planar array such that when the array is exposed toward the sun, that is, with its plane oriented normal to the line of sight theretoward, the rate of electrical generation by the array is maximized. For a specified magnitude of energy collection, the size and mass of the array are much smaller if the array is thusly continuously directable toward the sun.

The systems developed in the past have in some cases successfully decreased the size and mass of the solar array by automatic positioning mechanisms; however, such systems heretofore available have depended upon complex power driven sensing and positioning mechanisms. For example, the solar aspect sensor of such prior art systems is typically a solar cell telescope device which requires electronic amplifiers, comparators, and logic circuitry. In addition, the feedback components typically incorporate potentiometer position takeoff techniques requiring differential transformers, encoders, and the like.

Such systems obviously must draw power for their operation from the solar generator or other electrical source thereby increasing the size and mass of the system over what could otherwise be a smaller, lighter package. However, an even greater contribution to the size, weight and complexity of the orienting system is a primary mover which must develop appreciable torque or other positioning force for the array. It must be provided with electrical controls and electromechanical driving components; the latter typically involving rotating armature shafts which must be provided with lubrication and hermetic seals for satisfactory longevity in high vacuum environments.

Each of these and other aspects of the prior art systems add to the complexity of, and detract from the reliability of, automatic orienting apparatus heretofore known. In addition, it may be noted that the electrical wiring and soldering and insulation as well as other electrical, electromechanical and thermoelectrical components are vulnerable to damage or deterioration and are difficult to inspect and trouble-shoot in severe environments of high vacuum, electromagnetic radiation, wide temperature ranges with differential thermal expansion and contraction problems, and accelerations.

Accordingly, it is an object of the present invention to provide a radiant energy driven orientation system which is not subject to these and other disadvantages and limitations of the prior art.

It is another object to provide such apparatus which is passive; that is, which is operable without application of, or the requirement for extrinsic power except that received directly from the radiant source.

It is another object to provide such apparatus which does not require electric, electronic, or electromechanical or hydraulic circuitry, amplifiers, or logic elements.

It is another object to provide such apparatus which is mechanically simple, rugged, reliable, readily mass produced, inexpensive, and which is easily serviced.

It is another object to provide such apparatus which may operate for extremely long lifetimes in all types of severe environments.

It is another object to provide such apparatus which does not utilize rotary or sliding components requiring sealed lubrication.

SUMMARY OF THE INVENTION

Briefly, these and other objects are achieved in accordance with the structural features of an example of the invention which includes a sensing panel upon which is mounted a positioning force producing cylinder and piston, the fluid contained by which may be selected to be linearly expandable with the temperature of the body of the sensing panel, the relative position and motion of the piston within the cylinder is force coupled to the structure to be oriented.

The sensing panel has a radiation absorptive surface to be exposed toward the sun, or other source, and a radiation emissive surface shadowed therefrom, the net energy flux between the two surfaces determining the temperature of the sensing panel and consequently the lineal disposition of the piston within the drive cylinder.

The exposed absorptive panel surface is variably shadowed by a position shutter connected to the drive piston and by a sensor shutter connected to a radiation sensitive aspect sensor.

The aspect sensor, in this example, is an elementary solar telescope mounted in a fixed position with respect to the sensor panel and which, when pointing toward the sun, exposes, in a first manner, passive thermomechanical elements to solar radiant energy and which exposes the elements in a second manner when the telescope is not pointed directly toward the sun. The passive elements are mechanically connected to the sensor shutter, and their thermal expansion causes a positioning thereof which varies the degree to which the radiation absorbing surface of the sensing panel is exposed to the radiant solar energy.

Further details of these and other novel features and their operation as well as additional objects and advantages of the invention will become apparent and be best understood from a consideration of the following description when taken in connection with the accompanying drawings which are presented by way of illustrative example only.

BRIEF DESCRIPTION OF DRAWINGS

FIG. 1 is a perspective view of an example of a radiant energy driven system constructed in accordance with the principles of the present invention;

FIG. 2 is a sectional view of a portion of the structure shown in FIG. 1 taken along the reference lines 2—2 thereof;

FIGS. 3A, 3B, 3C, 3D, and 3E are schematic diagrams useful in illustrating the principles of operation of the invention; and FIG. 4 is a plan view of a portion of an alternative example of the invention.

DESCRIPTION OF THE PREFERRED EMBODIMENT

With specific reference now to the figures in more detail, it is stressed that the particulars shown are by way of example and for purposes of illustrative discussion only and are presented in the cause of providing what is believed to be the most useful and readily understood description of the principles and structural concepts of the invention. In this regard no attempt is made to show structural details of the apparatus in more detail than is necessary for a fundamental understanding of the invention. The description taken with the drawings will make it apparent to those skilled in the mechanical, thermomechanical, and electromechanical arts how the several forms of the invention may be embodied in practice. Specifically the details shown are not to be taken as a limitation upon the scope of the invention which is defined by the appended claims forming, along with the drawings, the part of this specification.

In FIG. 1 the example of the radiant energy driven orientation system illustrated includes a base support member which may be rigidly affixed to relatively stationary means such as, for example, the frame of a carrier vehicle, not shown. The base support member 10 terminates, in this example, in a stationary drum element 12. A rotatable supporting shaft 14 passes through the center of the drum element 12 and is rigidly affixed supportingly to a pair of solar collection panels 16 and 18 as well as to a sensor body member 20. It may be noted then that the supporting shaft 14 carrying the solar panels 16 and 18 and the sensor body member 20 is supported as a rotatable unit by its bearing within and its general relation with the fixed drum element 12. The solar panels 16 and 18, in this example, each comprise an array of solar electric cells 22 which are electrically intercoupled to provide a desired electrical power output when they are exposed to radiant flux from the sun. As noted above, the magnitude of electrical power output from such a system is maximized when the array is oriented normal to the incident direction of the radiation, hence the primary object is to maintain the desirable orientation of the panels toward the sun by rotating, as needed, the shaft 14 with respect to the mass support member 10.

It should also be noted that although the brief example shown refers to a system having a single degree of rotational freedom, it is elementary that an additional, orthogonal degree of freedom may be provided by adding a second sensor mechanism in, for example, a gimbal arrangement in the base support structure 10.

The shaft 14 is rotationally biased clockwise, as viewed in the drawings, by a coil spring 24 the opposite ends of which are affixed respectively to the shaft 14 and the stationary drum element 12. The torque due to the spring 24 is counter-balanced by that provided by a tension ribbon 26, the end 28 of which is affixed to the periphery of the drum element 12 and which extends tangentially from the cylindrical surface of the drum to a bar member 30 extending laterally from a piston shaft 32. The piston shaft cooperates in a piston-cylinder relation with a thermally expansive cylinder 34 affixed mechanically and thermally to the under, or shaded, radiative surface 36 of the sensor body member 20. Movement of the piston shaft 32 to the right, as viewed in the figure, increases the tension in the ribbon 26 forcing it to unwind from the drum element 12 and resulting in a clockwise rotation of the shaft 14. In addition to its action on the tension ribbon 26, expansion in the cylinder 34 also causes a movement to the right of a position shutter member 38, which causes, in turn, exposure of a larger proportion of a radiation absorptive surface portion 40 of the sensor body member 20 to the sun. This action, shown here only schematically, is carried to the position shutter member 38 through a connector member 42 shown rigidly interconnected between the spar 30 and the shutter member 38. Thus, it may be realized that when the average temperature of the sensor body 20 is increased, causing an expansion in connection with the cylinder 34, the shutter member 38 is moved in a manner to increase even further the exposure of the absorptive surface of the sensor body member 20 to be radiation flux constituting thereby what may be considered a positive or regenerative feedback effect as will be explained in more detail below.

This effect is utilized, in this example, to maintain and increase tension in the tension ribbon 26 for purposes of maintaining the orientation of the rotatable member in an angular orientation displaced clockwise with respect to that shown in the figure.

The remainder of the upper surface of the sensor body member 20 comprises a reflective sector 44 and a purality of absorptive strips 46. The strip sectors may be mutually parallel and be spaced along the upper surface of the sensor body member in a pattern corresponding to the array of spaced openings 48 in a sensor shutter member 50. The relation of the pattern of the openings 48 in the shutter to that of the absorptive strip sectors 46 is such that the lateral motion of the sensor shutter member 50, in the direction indicated by the motion arrow 52, causes a covering or exposure of the absorptive strip sectors 46 linearly, in this example, with respect to the lateral motion of the shutter member. In this regard, for example, lateral displacement of the sensor shutter member 50 to the left, as viewed in the drawing, causes a maximum exposure of the absorptive strip sectors to the incident solar radiation; while displacement to the right results in an exposure of substantially entirely reflective sectors of the surface to the solar radiation. This lateral displacement of the sensor shutter member 50 is controlled by a radiation direction sensor mechanism 54 which is carried by the sensor body member 20 and which is mechanically connected to the sensor shutter member 50 by a connecting rod member 56.

Referring to FIG. 2, some of the operational features illustrated generally in FIG. 1 are illustrated in more detail, albeit still in a schematic simplified form. The sensor body member 20 is shown in section through the expansive cylinder 34 and the radiation direction sensor mechanism 54. The upper surface of the body member includes reflective portions indicated at 44 and radiation absorptive sectors 40 and 46 disposed in a cooperable relation with the position shutter member 38 and the sensor shutter member 50, respectively. Also indicated are the series of spaced openings 48 of the shutter member 50 and their relation with the similarly spaced absorptive strip sectors 46. The connector rod member 56 is affixed to the sensor shutter member 50 and the connecting member 42 is shown interconnecting the piston shaft 32 and the position shutter member 38. The thermally expansive liquid, which may be generally of a relatively heavy mineral oil nature, is indicated at 58 and, as shown, in captive between an axially movable piston 60 and the inner cylindrical wall of the cylinder 34. A return spring 62 is shown disposed in axial compression between the right-hand end of the cylinder 34 and the outer face of the piston 60. The rotatable mounting rod 14 and its concentric relation with the stationary drum element 12 and the tension ribbon member 26 are also illustrated.

The radiation direction sensor mechanism 54 includes, in this example, a housing body 64 the outside surfaces of which may be made as reflective as possible whereby the sensing mechanism contained therewithin is thermally shielded from the solar radiation. A pair of symmetrically disposed, push-pull sensor members 66 and 68 are respectively affixed in a cantilever relation from the opposite walls 70 and 72 of the housing body 64. The sensor members in this example are of bimetallic strip composition and are of the character to bend downwardly as viewed in the figure when they are heated and upwardly when cooled. Each of the sensor members is slidingly coupled near its outer end 74, 76 to a respective transverse pin member 78, 80 affixed to the connector rod 56 whereby the flexing of a sensor member 66, 68, allowed by its connection with the side walls 70 and 72, is resolved into a force component longitudinally along the rod 56. The pin members, as well as a set of mounting bushings 82 and 84, may be fabricated of a chemically stable, self-lubricating substance such as, for example, Teflon plastic to facilitate smooth action of the connector rod 56 in response to the flexures in the cantilevered sensing elements. Furthermore, similar self-lubricated guides and mounting means for the various shutter elements may be provided, as desired, to minimize further the friction and backlash between the shutter members and the sensor body member 20.

A radiation input aperture is provided in the upper wall 88 of the housing body 64 symmetrically disposed with respect to the pair of sensor members 66 and 68 whereby when the sensor mechanism is oriented toward the source of radiation, the sensor elements are equally irradiated and heated resulting in a centering of the rod 56 with respect to the walls 70 and 72. When, however, as shown in the figure, the sensor system is not oriented toward the energy source, one of the sensor elements is irradiated more than the other. In the case shown, the sun is somewhat to the right causing a relative heating of the element 66 and a corresponding shadowing and cooling of the sensor element 68. The resulting unbalance in the cantilevered sensor elements is manifest, in a push-pull manner, as a downward rotation of the element 66 and an upward rotation of the element 68 with a consequent translation of the rod 56 to the left. Conversely, with the relative direction of the sun to the left, the rod is translated to the right.

Referring to FIGS. 3A through 3E the operation of the sensing mechanism is shown by means of a series of simplified diagrams illustrating the cooperative function of the shutter members 38 and 50, the thermally expandable cylinder and piston, and the radiation absorptive versus the reflective and radiative surfaces of the sensor body member responsive to the relative direction of the incident flux of radiant energy.

In FIG. 3A the sensor body member is shown oriented fully toward the source of radiant energy as indicated by the direction of the vectors 90 normal to the top surface 45 of the sensor body member 20. In such orientation the sensor shutter member 50, controlled through the rod 56 by the radiation direction sensor mechanism 54, and the position shutter member 38, controlled by the cylinder-piston 34-60, assume a shadowing role over the absorptive surfaces 40 and 46 such that a quiescent equilibrium condition exists between the net influx 92 of energy and the new outflow 94, causing a predetermined average temperature for the sensor body member 20 and a consequent particular volume and piston displacement associated with the force producing cylinder 34. The piston displacement information is coupled to the stationary drum element 12 through the tension ribbon 26. This particular combination of conditions, it may be noted, depends upon an initial calibration of the shutter members to provide a predetermined average temperature of the sensor body member 20 for a given intensity of the flux associated with the radiation indicated at 90 when the absorptive surfaces are oriented directly theretoward. Alternatively, a separate, automatically biasing shutter element as discussed in connection with FIG. 4, below, may be utilized to achieve an extra level of accuracy when desired.

In FIG. 3B, the flux 90 is incident somewhat from the right. This causes the radiation direction sensor mechanism 54 to move the sensor shutter member 50 to the left and expose more absorptive surface of the sensor body member 20 to the radiant flux. This results in a raising of the average temperature of the sensor body member and a consequent expansion of the fluid in the cylinder 34. The resulting displacement of the piston 60 to the right causes an increase in the tension in the ribbon 26 and a consequent rotation of the rotatable assembly with respect to the stationary drum element 12 as illustrated in FIG. 3C. With the resulting tendency toward alignment with the direction of the incident flux, the sensor shutter member 50 is returned by the mechanism 54 to its original position thereby tending to decrease the magnitude of absorbed energy and causing a consequent contraction of the fluid in the cylinder 34. The latter tendency is cancelled, in part, by the increase in exposure of absorptive surface by the displacement of the position shutter member 38. This effect causes an average temperature for the sensor body member 20 which is higher than that associated with the conditions shown in FIG. 3A and this results in the new orientation being stationary and stable.

Referring to FIG. 3D, the circumstance is shown in which the radiant flux 90 is incident upon the rotatable mechanism somewhat from the left. As described above in connection with the discussion of FIG. 2, this results in a displacement of the sensor shutter member 50 to the right, thereby shadowing a larger proportion of the sensor body member surface 45. This results in a lowering of the average temperature of the sensor body member 20 and, consequently, a contraction of the fluid within the expandable cylinder 34 with an associated displacement, to the left, of the piston 60. This action causes the position shutter member 38 to shadow an even larger portion of the surface 45 and decreases the tension in the ribbon 26. The lowering of tension in the ribbon 26, being counterbalanced by the return spring 24, see FIG. 1, causes a new equilibrium position for the rotatable assembly which is displaced relatively counterclockwise, as viewed in the drawing, and is illustrated particularly in FIG. 3E. It may be noted that when the rotatable mechanism is directed, as shown in FIG. 3E, toward the source of radiant energy 90, the sensor shutter member 50 assumes its normal lateral displacement as shown initially in FIG. 3A, while the lowering of tension in the ribbon 26 and the associated leftward displacement of the position shutter member 38 are maintained stable by the lower average temperature of the body member.

As indicated earlier, the accuracy of the various orientations shown of the rotatable mechanism with respect to the direction of the incident flux depends in part upon an initial calibration of the shutter members with respect to the overall intensity of the radiation. However, also as indicated above, the calibration may be automatic by virtue of a biasing shutter member 100 as illustrated in FIG. 4. In this plan view of the sensor body member 20, the radiation direction sensing mechanism 54 with its radiation aperture 86 is shown connected to the sensor shutter member 50 through the connecting rod 56. The lateral displacement of the sensor shutter member, indicated by the arrows 50, causes a variable shadowing of the absorptive strip segments 46 by the aperture slots 48 in the sensor shutter member 50. Similarly, the position shutter member 38, controlled through the connecting member 42, variably shadows the absorptive segment 40 of the upper surface 45 of the sensor body member 20.

The biasing shutter member 100 may function in a manner substantially similar to that of the sensor shutter member 50 in that its openings 102 variably expose or shadow portions of the absorptive strip segments 46 of the upper surface 45 of the sensor body member 20. The control of the lateral disposition of the biasing shutter member 100 is, however, distinct from that of the sensor shutter member 50 in that the control element 104 to which it is shown connected by a rod member 106 thermostatically extends or withdraws the biasing shutter member 100 across a portion of the upper surface of the sensor body member 20, as indicated by the motion arrows 106, in response to the temperature or thermal energy input on an omnidirectional basis, as implied by the spherical form of the thermostatic control mechanism 104. Hence, substantially irrespective of the direction of the incident radiation the position of the biasing sensor member 100 is determined by the incident flux density or radiation intensity. Furthermore, it may be noted that the time constant of the displacement of the biasing shutter member 100 may be desirably shorter than that associated with motion caused by the radiation direction sensor mechanism 54 whereby overall shadowing of the mechanism, or other change in intensity of radiation incident thereupon, as by a cloud cover or other atmospheric change of condition or structural shadowing of the mechanism or dynamic change in distance to the source of radiant energy may be compensated for in advance of a change in orientation due to a sensing by the cylinder 34 of a change in average temperature of the body member 20 due to causes other than orientation with respect to the source of radiation. The direction of motion of the biasing shutter 100 is to the right, as viewed in drawing, with an increase in intensity and conversely to the left with a decrease in intensity.

There has thus been disclosed and described a number of examples and structural aspects of a radiant energy driven orientation system, which achieves the objects and exhibits the advantages set forth hereinabove.

The embodiments of the invention in which an exclusive property or privilege is claimed are defined as follows:

1. A solar device including
    (1) a radiant energy driven orientation system comprising:
        base structure means for carrying at least one orientable member:
        thermal energy sensor body member rotatably mounted upon said base structure means and having a first portion of its surface exposable toward a predetermined source of radiant energy for absorbing energy therefrom and a second portion of its surface, thermally coupled to said first portion, exposable toward relatively non-radiating media whereby the average temperature of said sensor body member is a predetermined function of the relative magnitude of the absorbing and radiating fluxes associated respectively with said first and second surface portions;
        direction sensor, variable shutter means disposed contiguously over a first predetermined sector of said first surface portion;
        position sensor, variable shutter means disposed contiguously over a second predetermined sector of said first surface portion;
        direction sensor means connected to said direction sensor, variable shutter means for controlling the degree of exposure of said first sector of said first surface portion to said source of radiant energy responsive to the angular orientation of said sensor body member with respect to the direction of said energy flux from said source incident upon said sensor body member;
        thermally actuable, orienting force providing means thermally coupled to said sensor body member and connected to said position sensor, variable shutter means for controlling thereby the degree of exposure of said second predetermined sector of said first surface portion to said source responsive to said average temperature of said sensor body member;
        force transmissive means interconnected between said orienting force providing means and said base structure means for rotatably varying the angular disposition of said sensor body member with respect to said base structure member for maintaining said first predetermined surface portion thereof exposable toward said surface; and
    (2) at least one orientable solar energy collection panel rotatably carried by said base structure means and coupled to said sensor body member whereby said solar panel may be oriented toward said source synchronously with said sensor body member.

2. The invention, according to claim 1, in which said thermally actuable orienting force providing means comprises at least one cylinder and cooperating piston carried by said sensor body member and containing a thermally expansive fluid the volume of which, and consequently the lineal displacement of said piston, being a predetermined function of said average temperature of said sensor body member.

3. The invention, according to claim 1, in which said first surface portion comprises relatively reflective and relatively absorptive areas, with respect to said radiant energy, and in which said shutter means comprises radiation shielding means for varying the proportion of said reflective to absorptive areas which is exposed to the flux of said radiant energy.

4. The invention, according to claim 1, in which said thermal energy sensor body member includes a bias flux control surface segment and which further includes intensity sensor, variable shutter means disposed contiguously over said bias flux control surface segment; and intensity sensor means connected to said intensity control shutter means for controlling the degree of exposure of said bias flux control segment to said source of radiant energy responsive to the intensity of said energy flux from said source incident upon said sensor means.

5. The invention, according to claim 3, in which said direction sensor, variable shutter means is formed to include a plurality of apertures arranged in a predetermined array over said first sector of said first surface portion of said sensor body member.

6. The invention, according to claim 5, in which said relatively absorptive areas of said first surface portion include an array of absorptive areas corresponding geometrically to, and disposed in juxtaposed relation with, said predetermined array of apertures of said direction sensor, variable shutter means.

7. The invention, according to claim 1, in which said direction sensor means includes at least one sensor member of the character to change its mechanical state responsive to its temperature and being coupled to said direction sensor shutter members and radiant energy telescope means permitting the incidence of radiant energy onto said sensor member in variable degree responsive to the direction of orientation of said sensor body member with respect to said direction of said energy flux from said source.

References Cited

UNITED STATES PATENTS 3,070,699   12/1962   Lehmann et al. ____ 136—89 X

ALLEN B. CURTIS, Primary Examiner

U.S. Cl. X.R.

250—203